United States Patent [19]

Yamaguchi et al.

[11] 4,337,643
[45] Jul. 6, 1982

[54] KNOCK DETECTING APPARATUS FOR INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 211,296

[22] Filed: Nov. 28, 1980

[30] Foreign Application Priority Data

Nov. 30, 1979 [JP] Japan ................................. 54-155765

[51] Int. Cl.³ ............................................. G01L 23/22
[52] U.S. Cl. ....................................................... 73/35
[58] Field of Search ........................... 73/35, 651, 652; 310/25

[56] References Cited

U.S. PATENT DOCUMENTS 4,096,735 6/1978 Huntzinger et al. .
4,108,006 8/1978 Walter ............................... 73/517 R
4,275,586 6/1981 Gast et al. .

Primary Examiner—James J. Gill
Attorney, Agent, or Firm—Cushman, Darby & Cushman

[57] ABSTRACT

A knock detecting apparatus for internal combustion engines is provided with a vibrating rod of a magnetic material having a resonance characteristic in a knock frequency hand of an engine, a free end of the vibrating rod is inserted in a round through hole of a core to form an air gap between the inner surface of the round through hole and the outer surface of the vibrating rod, and the air gas constitutes a portion of a magnetic path between the core and the free end of the vibrating rod. The vibrating rod is allowed to vibrate in more than one directions and air gaps are also formed in respective vibrating directions thereby enabling to detect vibrations due to knock in more than one directions.

6 Claims, 6 Drawing Figures

KNOCK DETECTING APPARATUS FOR INTERNAL COMBUSTION ENGINE

BACKGROUND OF THE INVENTION

1. Field of the Invention

The present invention relates to knock detecting apparatus for detecting the presence of knock in an internal combustion engine.

2. Description of the Prior Art

Knock detecting apparatus of the above type are known in the art in which a piezoelectric acceleration detector including a piezoelectric element is used to detect the knock-induced vibrations of an engine.

However, these known apparatus have the following disadvantages.

(1) Due to the use of a piezoelectric element of the essentially high-impedance type, its characteristics are subject to the effects of humidity and dirt and thus it is difficult to generate stably small trace-knock signals (due to large drift and vibration variations). Also, the piezoelectric characteristic of the element is determined by polarization, and thus due to the severe use conditions varying cyclically between the high and low temperature conditions the polarization tends to be lost gradually with the corresponding deterioration of the sensitivity. The decreased sensitivity results in a rise in the knock control level causing sometimes damages to the engine due to its knocking.

(2) It is desired that the detector is constructed inexpensively. However, since the piezoelectric element is a high-impedance device, its output signal must be amplified by means of an expensive amplifier of the high-impedance input type which is called as a charge amplifier. Also, since the high-impedance type amplifier tends to malfunction due to the effect of noise or the like caused by the ignition signals of the engine, it is necessary to use a detector of more expensive and complicated construction to overcome the deficiency.

(3) When used as a vehicle detector, the piezoelectric element has many disadvantages in terms of durability, cost and the like such as lower resistance to shock, tendency to crack and break and necessity to use cooling means or the like when the detector is used in high temperature conditions.

SUMMARY OF THE INVENTION

With a view to overcoming the foregoing deficiencies in the prior art, it is the object of the present invention to provide an improved knock detecting apparatus comprising a magnetic path including a vibrating means having a resonance characteristic with respect to those frequencies at which knock is caused and disposed to vibrate in at least two vibration directions, the magnetic path forming a gap between it and the vibrating means in each of the vibration directions, and magnetic flux sensing means.

Thus, in accordance with the apparatus of this invention, the resonance frequency of the vibrating means can be easily adjusted to knocking high frequencies so that the sensitivity of the vibrating means to the knocking frequencies can be increased remarkably and also the detecting sensitivity to the vibration noise inevitably generated from the engine body (e.g., the vibration noise due to valve seating) is relatively decreased, thus improving the S/N ratio and making possible the detection of low level knock.

Also, due to the apparatus being operated magnetically, it is possible to use as its component parts a coil, a magnet, etc., which are excellent in environmental resistance, to firmly support the vibrating means, to withstand sufficiently the severe use conditions of vehicles, to ensure stable operation without any danger of deteriorating the characteristic, to prevent cracking and breaking of the elements and to ensure a sufficient mechanical strength. Further, since the detection of knock signal can be effected by means of such magnetically sensitive element as a coil or magneto-resistance element forming low-impedance detecting means which is quite contrary to the high-impedance piezoelectric element, the detecting means is practically not subjected to the effect of humidity, etc., is highly stable in operation against electric noise such as ignition noise, is simple in construction and small in size and allows the use of an inexpensive material which is well suited for mass production purposes.

DESCRIPTION OF THE PREFERRED EMBODIMENTS

The present invention will now be described in greater detail with reference to the illustrated embodiments.

Figure 1:
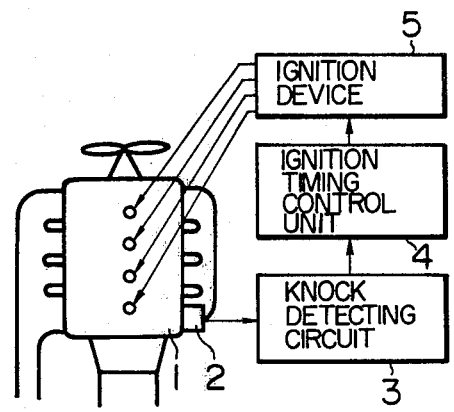
FIG. 1 is a schematic block diagram showing the construction of a knock feedback ignition system incorporating a knock detecting apparatus according to the present invention.

Referring first to FIG. 1, there is illustrated the construction of a knock feedback ignition system incorporating a knock detecting apparatus according to the present invention. In the Figure, numeral 1 designates a four-cylinder in-line type internal combustion engine, and a knock detecting apparatus 2 is attached to the cylinder block of the engine 1 by means of a screw or the like. Numeral 3 designates a knock detecting circuit for detecting the engine knock from the output signal of the knock detecting apparatus 2, and 4 an ignition timing control unit responsive to the output of the knock detecting circuit 3 to advance or retard the ignition timing into the optimum position. The output signal of the control unit 4 is distributed through a known type of ignition device 5 to the spark plugs fitted into the engine 1 to ignite the mixture. The knock detecting circuit 3 used in this system detects an ignition signal which is not shown such that a noise component produced by the engine vibration during a predetermined time interval or a predetermined angle of crankshaft rotation immediately following the ignition where there is no occurrence of knock, is sampled by means of the output of the detecting apparatus 2 and then compared with the output of the detecting apparatus 2 (its integrated value or averaged value may sometimes be used) produced during a predetermined time interval or a predetermined crank angle after the top dead center (after the peak combustion pressure) where there is a high tendency to knock, thereby determining the presence of knock. Alternatively, the presence of knock can be determined in a probability manner instead of simply relying on a single signal. For instance, the presence of knock can be determined in terms of the percentage of knocking events occurring in 100 times of ignition. The ignition timing control unit 4 advances or retards the ignition timing in accordance with the presence or absence of knock. While the detailed constructions of the knock detecting circuit 3 and the ignition timing control unit 4 are well known in the art and will not be described, it should be apparent that the detecting apparatus of this invention can be used with these circuit and unit of any type provided that knock is detected and the ignition timing is controlled correspondingly.

Figure 2A:
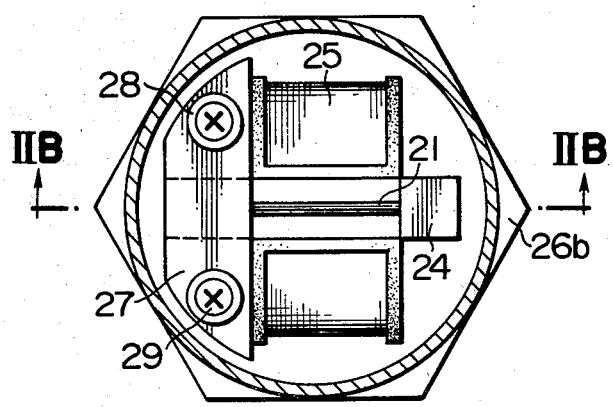
FIGS. 2A, 2B and 2C show a first embodiment of the detecting apparatus according to the invention, with FIG. 2A showing a cross-sectional view taken along the line IIA—IIA of FIG. 2B, FIG. 2B a longitudinal sectional view taken along the line IIB—IIB of FIG. 2A, and FIG. 2C a side view showing the principal parts of the apparatus.
Figure 2B:
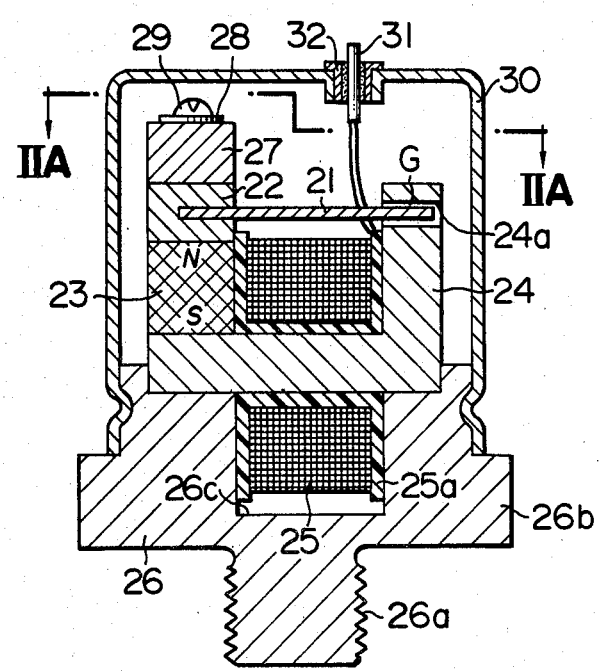
Figure 2C:
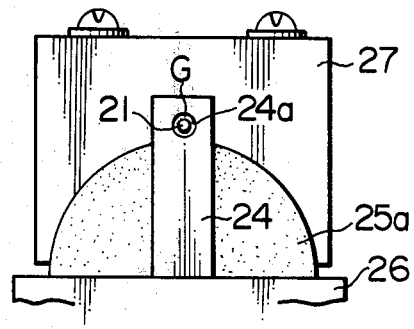

Next, the knock detecting apparatus 2 will be described in detail. In FIGS. 2A to 2C showing its first embodiment, numeral 21 designates a vibrating member made from a magnetic material (e.g., iron or iron-nickel alloy) in rod form of a circular cross-sectional shape and having a resonance point or frequency within the knocking frequencies ranging from 5 to 10 kHz, and one end of the vibrating member 21 is secured by driving fit to a support member 22 made of a magnetic material. Numeral 23 designates a magnet having a magnetic force and magnetized in the polarity shown and its north pole side is in contact with the support member 22. Numeral 24 designates an L-shaped core made of a material, e.g., iron, iron-nickel alloy or ferrite and forming a magnetic path in association with the vibrating member 21, the support member 22 and the magnet 23. One end of the core 24 is in contact with the south pole of the magnet 23, and a hole 24a is formed through the other end of the core 24 such that the other end of the vibrating member 21 is inserted into the hole 24a substantially centrally to form a gap G therebetween. As a result, the gap G is defined as a ring shaped one between the core 24 and the vibrating member 21. Thus, when the vibrating member 21 vibrates in any radial direction, the width of the gap G is varied with the resulting variation in the magnetic reluctance of the magnetic path. Numeral 25 designates a coil forming magnetic flux sensing means for sensing a change in the magnetic flux caused by the reluctance change. The coil 25 is wound on the core 24 through the intermediary of a bobbin 25a and the bobbin 25a is secured to the core 24 by means of an adhesive or the like to prevent any variation of the flux linkage due to a change in the relative positions of the coil 25 and the core 24. Numeral 26 designates a housing made of a nonmagnetic material such as brass and including a threaded portion 26a formed in the lower part for screwing the apparatus into the cylinder block of the engine, a wrench hexagon portion 26b formed on the outer periphery and a recess 26c formed in the central part to receive the coil 25. Numeral 27 designates a keep member made of a nonmagnetic material and disposed to hold in place the previously mentioned members forming the magnetic path, and the keep member 27 is firmly secured, along with washers 28, to the housing 26 by means of screws 29 to hold down the support member 22, the magnet 23 and the core 24. Numeral 30 designates a cover attached by caulking to the housing 26, and fitted in the cover 30 is a hermetic seal 32 having terminals 31 firmly fitted therein for signal delivering purposes. The ends of the coil 25 are connected to the terminals 31 so that the coil ends are connected to the knock detecting circuit 3 through the terminals 31 and the external signal lines.

With the construction described above, the operation of the detecting apparatus 2 will now be described. As mentioned previously, the detecting apparatus 2 is attached to the cylinder block by firmly screwing the threaded portion 26a thereinto. The vibrations produced in the cylinder block upon the occurrence of knock are transmitted to the vibrating member 21 through the housing 26, the core 24, the magnet 23 and the support member 22. Since the vibrating member 21 has its one end firmly secured to the support member 22, the vibrating member 21 vibrates in accordance with the frequency and magnitude of the vibrations as well as the natural frequency of the vibrating member 21 itself. In this case, since all the component parts excluding the vibrating member 21 are firmly attached to the housing 26 to move together therewith, the vibrating member 21 alone moves in the magnetic path so that the gap G formed into ring shape around the vibrating member 21 is varied and the reluctance of the magnetic path is varied correspondingly, thus generating in the coil 25 a voltage output corresponding to the magnetic flux change. This output signal is supplied to the detecting circuit 3 through the terminals 31 provided in the hermetic seal 32 and through the two signal lines. It should be noted that although not all the magnetic flux generated from the magnet 23 is allowed to flow in the magnetic path (due to some leakage of the flux to the outside), the materials and the spacing of the component parts are suitably selected such that the leakage flux becomes sufficiently small as compared with the flux flowing through the magnetic path, thus giving rise to no difficulty in the detection of knock. In this case, since the resonance point of the vibrating member 21 is selected to come within the range of knocking frequencies (at around the middle of 5 to 10 kHz or 8 kHz), the knock detecting sensitivity is particularly increased at these frequencies and the sensitivity to signals in the other frequency ranges is relatively deteriorated, thus improving the S/N ratio in the knock detection.

Also, since the vibration of the vibrating member 21 in any direction radially results in a change in the width of the gap G and the coil 25 generates a voltage output corresponding to the magnetic flux change, the vibrating member 21 is capable of detecting the vibrations generated in all the directions tending to vibrate the vibrating member 21 radially. In this connection, the vibrations due to the knocking of an engine do not occur in one direction only and basically the knock-induced vibrations propagate in all the directions of the combustion chamber. Thus, by arranging the vibrating member 21 as in the previously-mentioned embodiment so as to detect the vibrations induced by knocking in all the directions tending to vibrate the vibrating member 21 radially, it is possible to accurately detect the presence of knock in the engine.

While, in the above-described first embodiment, the ring-shaped gap G is formed to surround all the outer surface of the end of the vibrating member 21, the gap G needs not always be formed to surround all the outer surface of the end of the vibrating member 21 and a notch may be formed in the portion of the core 24 which is adjacent to the gap G. Also, the cross-sectional shape of the vibrating member 21 needs not always be circular and it may be formed into any other shape such as square shape.

Figure 3A:
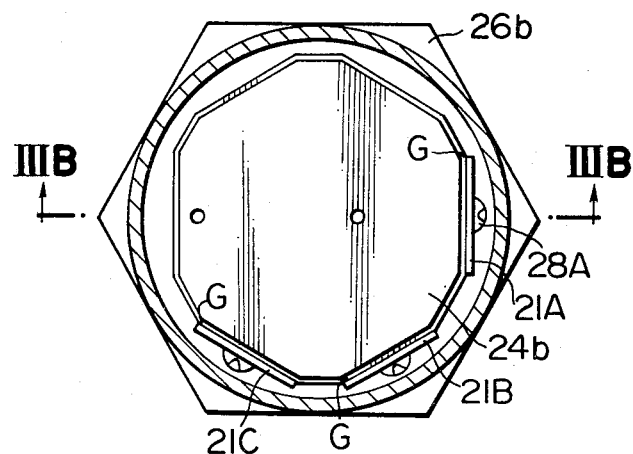
FIGS. 3A and 3B show a second embodiment of the detecting apparatus according to the invention, with FIG. 3A showing a cross-sectional view taken along the line IIIA—IIIA of FIG. 3B and FIG. 3B showing a longitudinal sectional view taken along the line IIIB—IIIB of FIG. 3A.
Figure 3B:
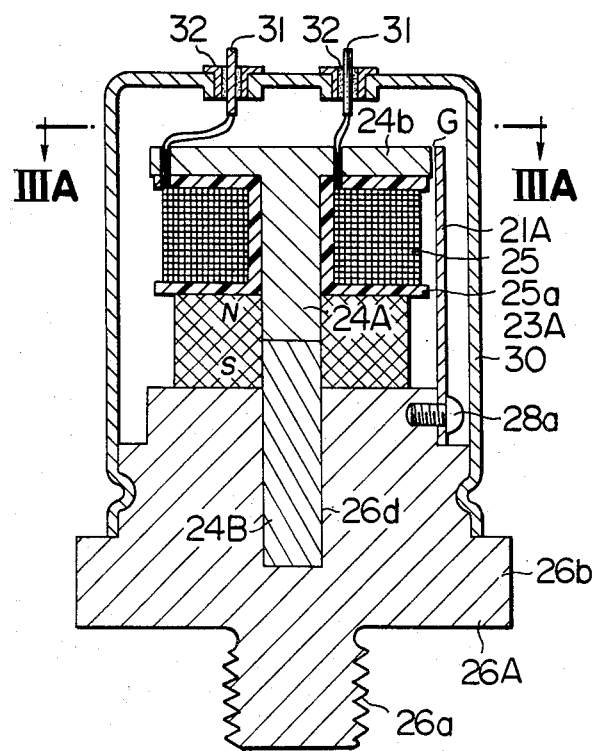

FIGS. 3A and 3B show a second embodiment of the detecting apparatus 2. In this second embodiment, a ring magnet 23a which is magnetized in the vertical direction is arranged on a housing 26A made of a magnetic material, and a bobbin 25a having a coil 25 wound thereon is arranged on the magnet 23a. A hole is formed centrally through each of the bobbin 25a and the magnet 23A, and inserted into these center holes is a center core 24A made from a magnetic material and including a polygonal collar 24b at its upper end. A bar member 24B made of a nonmagnetic material is secured to the lower end of the core 24A. The bar member 24B is fixed by driving fit in a driving fit recess 26d formed in the central portion of the housing 26A and in this way the magnet 23A, the center core 24A and the coil 25 are firmly secured to the housing 26A. The upper end outer surface of the housing 26A is formed into a polygonal shape and a plurality (three) of vibrating reeds 21A to 21C forming a vibrating means each has its one end secured to one side of the polygonal upper end by a screw 28A. Each of the other ends of the vibrating reeds 21A to 21C is arranged to face the collar 24b of the center core 24A across a gap G.

With the second embodiment described above, a magnetic path is formed comprising the north pole of the magnet 23A, the center core 24A, each of the vibrating reeds 21A to 21C, the housing 26A and the south pole of the magnetic 23A. As a result, when each of the vibrating reeds 21A to 21C vibrates in response to the knock-induced vibrations, the gap G is changed so that the coil 25 senses the change as a change in the magnetic flux and generates a voltage output.

Thus, in accordance with the second embodiment, due to the provision of the vibrating reeds 21A to 21C adapted for vibration in different directions, it is possible to sense the vibrations induced by knocking in the plurality of directions in which the vibrating reeds 21A to 21C vibrate.

While, in the above-described second embodiment, the three vibrating reeds 21A to 21C are used, it is possible to use only two or more than four vibrating reeds depending on the number of angles included in the polygonal portion of the housing 26A and in the polygonal collar 24b. Also, while, in FIG. 3, vibrating reeds may be provided at the opposite positions to the vibrating reeds 21A to 21C, this is not desirable since the opposite gap G of each vibrating reed varies in width in the opposite direction and the resulting reluctance change due to the vibration of the vibrating reed is decreased.

Further, while, in the above-described embodiments, the magnetic flux sensing means comprises the coil 25, it is possible to use a magneto-resistance element or a Hall device.

Further, while, in the embodiments, the magnets 23 and 23A are used as a means for supplying magnetic flux to the magnetic path, it is possible to use an excitation coil wound on the magnetic path. Also, by connecting the coil 25 to an oscillator such that a change in the reluctance of the magnetic path due to the vibration of the vibrating member 21 or the vibrating reeds 21A to 21C is sensed as a change in the load of the oscillator, it is possible to eliminate the need to use any special means for supplying magnetic flux to the magnetic path.

Further, by using a plurality of vibrating pieces of different lengths for the vibrating member 21 or the vibrating reeds 21A to 21C, it is possible to obtain a plurality of resonance characteristics at different frequencies within the range of frequencies where knock occurs.

It will thus be seen from the foregoing description that by virtue of the fact that a gap or gaps are formed around vibrating means made of a magnetic material and having a resonance characteristic with respect to the range of frequencies where knock occurs, that magnetic flux sensing means senses a magnetic reluctance change due to a change in the width of the gap caused by the vibration of the vibrating means, that the vibrating means is adapted for vibration in at least two vibration directions and that the gaps are each formed in one of at least two different directions in the magnetic path, the present invention has the following great advantages.

(1) By adjusting the length of the vibrating means from its fixed end, it is possible to easily adjust its resonance characteristic to the range of frequencies where knock occurs, with the result that the sensitivity of the detecting apparatus to knocking can be improved remarkably and also the sensitivity to vibration noise (e.g., vibrations due to valve seating) caused inevitably by the operation of the engine is decreased relatively, thus improving the S/N ratio and making possible the detection of very light knock.

(2) Due to the fact that the sensing means of the detecting apparatus is operated magnetically and that the component parts of the apparatus include a coil, a magnet, etc., which are excellent in environmental resistance and having sufficient resistance to the severe environmental conditions of vehicles, the detecting apparatus is less likely to give rise to such deficiencies as encountered with the piezoelectric element, that is, the signal drift due to humidity, the breaking and cracking of the element, etc., and moreover the apparatus not only has a sufficient mechanical strength but also is capable of generating a stable output.

(3) The coil or the magneto-resistance element has an impedance which is considerably lower than that of the piezoelectric element, is less susceptible to the effect of ignition noise, etc., does not require the use of a charge amplifier as the amplifier, is not subject to the leakage of charge due to dirt and humidity and low in cost and has an excellent stability.

(4) Another great advantage is that the required material is not so high in cost as the piezoelectric element and excellent in terms of mass production properties and durability, and thus the apparatus is highly efficient, low in cost, excellent in durability and capable of detecting such light knock as trace knock.

(5) It is possible to detect the knock-induced vibrations in a plurality of directions and thus basically it is possible to detect more accurately the occurrence of knock in a plurality of directions.

We claim:

1. A knock detecting apparatus for internal combustion engines, comprising:
   housing means;
   vibrating means made of a magnetic material and having a resonance characteristic in a range of frequencies where knocking of an engine occurs, said vibrating means being disposed to vibrate in at least two different directions of vibration;
   magnetic path means mounted on said housing means including a plurality of gaps formed adjacent to said vibrating means, each of said gaps being formed in said magnetic path means in one of said at least two different vibration directions; and magnetic flux sensing means for sensing a change in the reluctance of said magnetic path means due to a change in the width of said gaps caused by vibration of said vibrating means.

2. An apparatus according to claim 1, wherein said vibrating means is in the form of a rod disposed for vibration in said different vibration directions.

3. An apparatus according to claim 2, wherein said gaps in said magnetic path means are formed into a ring shape surrounding a free end portion of said rod.

4. An apparatus according to claim 1, wherein said vibrating means includes a plurality of vibrating elements disposed to vibrate in different vibration directions whereby allowing said vibrating means to vibrate in said different vibration directions, and wherein each of said gaps in said magnetic path means is formed to face one of said vibrating elements.

5. A knock detecting apparatus for internal combustion engines comprising:

core means divided into two parts and sandwiching therebetween a magnet, said core means together with said magnet forming a substantially U-shaped configuration, an end portion of one leg of said U-shaped configuration being provided with a round through hole having an axis along a line connecting both end portions of said U-shaped configuration;

rod-shaped vibrating means made of a magnetic material and having a diameter smaller than a diameter of said round through hole, one end of said rod-shaped vibrating means being fixed to an end portion of the other leg of said U-shaped configuration and the other free end of said rod-shaped vibrating means being inserted into said round through hole of said one leg of said U-shaped configuration, an air gap being formed between the inner wall of said round through hole and the outer surface of the inserted portion of said rod-shaped vibrating means, and coil means wound around a portion of said core means for detecting a change in magnetic flux caused by vibrations of the free end of said rod-shaped vibrating means due to an engine knock, said magnetic flux passing through a closed magnetic path formed by said core means, said air gap, said rod shaped vibrating means and said magnet.

6. A knock detecting apparatus for internal combustion engines comprising:

a ring-shaped magnet, magnetized along the longitudinal axis thereof;

a core having a flanged portion at one end and having a nonmagnetic bar securely connected to the other end of said core, said flanged portion having a polygonal periphery, said core and said nonmagnetic bar penetrating through said ring-shaped core so that said core is in contact with one magnetic pole of said ring-shaped magnet;

a coil wound around said core between said flanged portion of said core and said ring-shaped magnet;

a housing made of a magnetic material for mounting said ring-shaped core, said coil and said core with said nonmagnetic bar securely fixed to said housing, said housing being in contact with the other magnetic pole of said ring-shaped magnet; and a plurality of vibrating reeds having one ends secured to said housing and having the other free ends respectively spaced from different sides of said polygonal periphery of said flanged portion of said core to form air gaps therebetween, said coil detecting a change in magnetic flux passing through a closed magnetic path formed by said ring-shaped magnet, said core, said air gaps, said plurality of vibrating reeds and said housing when said plurality of reeds vibrate respectively in different directions due to knock of an engine.

* * * * *